United States Patent Office 3,318,828
Patented May 9, 1967

3,318,828
STORAGE STABLE ISOCYANATE-MODIFIED DRYING OIL AND DRYING OIL-ALKYD COMPOSITIONS AND PROCESS FOR PREPARATION THEREOF
Jerome A. Seiner, Pittsburgh, Pa., assignor to Pittsburgh Plate Glass Company, Pittsburgh, Pa., a corporation of Pennsylvania
No Drawing. Filed May 23, 1962, Ser. No. 196,924
15 Claims. (Cl. 260—22)

This invention relates to improved isocyanate-modified oil compositions, and more particularly to the treatment of such compositions to remove residual isocyanate groups and thereby improve their properties.

Isocyanate-modified oil compositions, sometimes called urethane oils, are reaction products obtained by reacting isocyanates with the alcoholysis products of vegetable or marine drying, semi-drying or non-drying oils and one or more polyhydroxy compounds; in some instances a polybasic acid is also included in the composition. These urethane oils may be compared to alkyd resins in which all or part of the polybasic acid of the alkyd is replaced by an organic isocyanate.

Such isocyanate-modified oil compositions are well known to the art and have certain well developed uses. For example, the urethane oils made from drying or semi-drying oils are particularly useful in coating compositions which are fast drying and produce hard films having excellent abrasion and chemical resistance, as well as good weathering characteristics. Those urethane oils produced from non-drying oils are also useful as plasticizers and in similar applications wherein their particular properties can be advantageously utilized.

While the urethane oils and coating compositions produced therefrom have numerous advantages which make them uniquely valuable in certain applications, they also possess characteristics which in many instances are undesirable and preclude their utilization for some purposes. For instance, the isocyanate-modified oil compositions often have a marked tendency to gel prematurely, and thus have very short shelf life, making them practically impossible to store for any length of time. This tendency is usually due to the presence of residual free isocyanate groups in the urethane oil. Such free isocyanate groups are generally present even though stoichiometric or less than stoichiometric isocyanate to hydroxyl ratios are used in producing the composition, since it appears that the last portions of the isocyanate react with difficulty.

Heretofore, it has been suggested to add certain alcohols in order to stabilize some isocyanate-modified compositions. Again, the use of alcohols in this manner, while effective with certain compositions, introduces other disadvantages including increased cost, handling difficulties and safety problems.

It has now been discovered, and it is upon this discovery that this invention is primarily predicated, that water can be used to treat urethane oils and is effective in removing essentialy all residual isocyanate groups from the urethane oil quickly and easily, and without the undesirable effects which water would be expected to produce in such compositions.

The effectiveness of the water treatment, as disclosed herein, is unexpected and somewhat contrary to certain principles known to the art. For example, it is known that water generally reacts with isocyanate groups substantially slower than do alcohols, often only one-tenth as fast. However, rather than the water treatment being too slow for effective use in treating isocyanate-modified oil compositions, it has been found to react rapidly and without particular conditions being necessary. Also, water is not generally compatible with oils since the two are immiscible and tend to form separate layers; but it has been found that the water reacts so rapidly and that such small amounts are effective that this problem is essentially never encountered in the treatment method described herein. Still another problem which one should theoretically encounter but which has not been found to be troublesome in practice is due to the reactivity of water with isocyanate groups to produce amino groups, which are known to react with isocyanate groups; such reactions taking place in the reaction mixture would cause gelation of the mixture rather than inhibit it. It is for such reasons that the art has considered it necessary to maintain urethane oils in essentially anhydrous condition both during their preparation and during storage. As mentioned, however, the treatment with water carried out in accordance with the method described herein avoids the difficulties which one would expect and provides an economical, effective and practical method of removing residual isocyanate groups from the urethane oils.

The isocyanate-modified oil compositions which are treated in accordance with this invention are those urethane oils which are produced by reacting a drying, semi-drying or non-drying vegetable or marine oil, or an oil acid of such an oil, with an organic isocyanate. These isocyanate-modified oil compositions are extensively known and used in the art and the water treatment method of my invention is applicable to any such urethane oil made in any conventional manner. Included among the oils which are thus used in producing the urethane oils are linseed oil, perilla oil, soybean oil, tung oil, castor oil, corn oil, dehydrated castor oil, cottonseed oil, croton oil, olive oil, fish oils, oiticica oil, peanut oil and similar oils, as well as oil acids of such oils. It is preferred to utilize drying oils and semi-drying oils in making the urethane oil compositions, because the compositions produced thereby find greater utility in the art.

In producing the urethane oils, the drying, semi-drying or non-drying oil is reacted with a polyol and an organic isocyanate. Any polyol conventionally employed to produce urethane oils can be used to produce the isocyanate-modified oil compositions which are treated by the method of this invention. The polyols used include ethylene glycol, propylene glycol, hexamethylene glycol, pinacol, glycerol, trimethylolpropane, hexanetriol, erythritol, pentaerythritol, mannitol, and other polyhydroxy alcohols having for example, 2 to 10 hydroxy groups and 2 to 20 carbon atoms, as well as resinous polyols such as unsaturated aliphatic alcohol polymers and copolymers, for example, homopolymers of unsaturated aliphatic alcohols having 2 to 10 carbon atoms, such as allyl alcohol or methallyl alcohol, and copolymers of such alcohols with other ethylenically unsaturated monomers, such as styrene or acrylonitrile.

Similarly, any of the many isocyanates known and used to produce urethane oils can be used in producing those urethane oils to be treated with water. Included are, for example, phenyl isocyanate, tolyl isocyanate, hexamethylene diisocyanate, cyclohexyl-1,4-diisocyanate, toluene diisocyanates, diphenyl methane-4,4'-diisocyanate, biphenyl-4,4' diisocyanate, naphthylene diisocyanates, 1,2,4-benzene triisocyanate, butane-1,2,2-triisocyanate, and the like. The toluene diisocyanates are the most widely available isocyanates and at present are most often used in producing urethane oils.

A catalyst is sometimes employed in making urethane oils; litharge, tin salts and calcium salts are often used. When thus employed, the catalyst is present in ordinary catalytic quantities, usually about 0.01 percent to 1 percent or more by weight.

In producing the urethane oils, the temperatures of reaction, as well as the proportions of the oil, alcohol and isocyanate, are those which are normally used and can be varied widely, depending upon the particular reactants and the particular composition desired. Generally speaking, temperatures between room temperature (about 25° C.) and about 300° C. are employed for the alcoholysis reaction, although in many instances it is desirable to use temperatures of at least about 100° C.; i.e., between about 100° C. and 300° C. The reaction with the isocyanate is generally carried out between 35° C. and 125° C. Usually the oil and the alcohol are reacted in an oil to alcohol weight ratio between about 3 to 1 and about 25 to 1, and this product is reacted with about 0.5 percent to 50 percent by weight of the organic isocyanate.

The water treatment of this invention is particularly applicable to the treatment of isocyanate-treated oil-modified alkyd resins. In this embodiment, the isocyanate-modified oil composition is produced by reacting a drying, semi-drying or non-drying oil of the type discussed above with a polyhydric alcohol and then this product is further reacted with a polybasic carboxylic acid or anhydride, as in the conventional method of making alkyd resins. However, in place of part of the polybasic acid or anhydride which would otherwise be used, an organic isocyanate is substituted, whereby there is produced a particularly desirable type of urethane oil. In this embodiment, the polybasic carboxylic acid which is utilized can be any of those which are known and used in producing alkyd resins; some examples of such acids are phthalic acid, isophthalic acid, terephthalic acid, succinic acid, adipic acid, maleic acid, fumaric acid, malic acid, citric acid, camphoric acid, and diphenic acids, as well as the anhydrides of such acids. The oil, polyhydric alcohol and isocyanate can be any of those discussed and exemplified above.

The method and conditions for making such isocyanate-treated oil-modified alkyds are well known to the art and are exemplified by the teachings in such patents as U.S. Patent 2,282,827. Most often, the amount of isocyanate used is between about 1 percent and 25 percent by weight of the oil-modified alkyd resin, depending upon the hydroxyl number, the nature of the alkyd resin, and the type of oil modifying the resin; those resins modified with drying oils require lesser amounts of isocyanate than those containing semi-drying or non-drying oils. The nature of the organic isocyanate should also be considered; with toluene diisocyanates and a drying oil alkyd, it is often preferred to use about 20 percent diisocyanate based upon the alkyd resin solids. The reaction of the oil-modified alkyd resin with the isocyanate can be carried out at any suitable temperature, such as those mentioned above, but it is preferred to use temperatures near or below about 100° C., usually between about 35° C. and about 110°C.

The water treatment as disclosed herein is particularly effective in treating urethane oil compositions produced by reacting toluene diisocyanates with an oil-modified alkyd resin prepared from phthalic anhydride, pentaerythritol and glycerol, which composition is a widely used urethane oil.

The treatment with water is easily and simply carried out by mixing water with the urethane oil. The reaction takes place immediately when the water and urethane oil are admixed, without the necessity for any particular reaction conditions. Although not absolutely necessary, it is desirable to provide agitation in order to promote good contact between the water and the urethane oil. The temperature at which the isocyanate-modified oil is treated with the water is not critical and can be varied from room temperature to very highly elevated temperatures, although above the boiling point of water special problems of mixing, etc., are introduced. It is generally preferred to add the water at somewhat elevated temperatures, since the viscosity of the urethane oil is lower at such temperatures and mixing is thereby facilitated. In order to avoid the use of excessively large amounts of water and the attendant loss of isocyanate, it is not desirable to add the water until the reaction of isocyanate is substantially complete; i.e., until at least about 95 percent and preferably about 98 percent or more has reacted. In practice, substantial completion of the reaction is evidenced by a leveling off of both the rise in viscosity of the reaction mixture and the drop in isocyanate content. It is usually most satisfactory to add the water at the end of the reaction producing the urethane oil and at the reaction temperature, which, as mentioned, is generally between about 35° C. and about 110° C.

The water, while usually added in the form of ordinary liquid water, can be added as ice, steam, vapor or in a water-bearing reagent, if so desired.

The amount of water which is used to treat the urethane oil is that amount which is sufficient to react with essentially all of the free isocyanate groups in the oil. The number of free isocyanate groups, and therefore the amount of water which should be added in any particular instance, can be quickly and easily determined by conventional analytical techniques. For example, the free isocyanate groups present can be determined in very small concentrations and with considerable accuracy by the use of an infrared spectrophotometer. By comparing the optical density of the isocyanate band, which is one of the strongest infrared absorption bands known (4.4 microns), with the optical density of the carbon-hydrogen band (3.4 microns) of a solution or film of the urethane oil, the presence of free isocyanate groups is determined down to isocyanate contents of 0.01 percent and below, with a precision of about 5 percent. In another method of determining free isocyanate groups, an excess of N-butylamine is added to a sample and undestroyed amine is back-titrated with standard acid. Using such methods, the amount of water required to react with the free isocyanate groups present is easily ascertained.

Still another simple and empirical method of determining when water sufficient to react with all the free isocyanate groups has been added, is by monitoring the viscosity of the urethane oil (which is usually a part of the operating procedure in any case). It has been found that any excess water reduces the viscosity of the oil. Thus, to determine when all the free isocyanate groups have been removed, water is added until the viscosity begins to drop, at which point it is known that essentially no more free isocyanate groups are present and that sufficient water has been added.

There is no critical upper limit to the amount of water that can be added and in some instances large excesses of water can be added and tolerated. However, it is often desirable to avoid the phase separation of the reaction mixture which may occur in the presence of too much water beyond that which is necessary to react with the free isocyanate groups. If there is no phase separation, a recovery step or purification of the treated oil is usually not necessary even though some excess water is present. While considerably more water than is required to react with all the free isocyanate groups can be added without phase separation, this gives a practical limit to the amount of water which is preferably added and one wihch is quickly and easily determined for any given composition by simple visual test. The optimum amount of water used with any given composition varies with the particular components of the urethane oil being treated, but it is usually within the range of about 0.01 and about 0.5 percent based upon the weight of the urethane oil.

The mechanism by which the water treatment reacts with and removes the free isocyanate groups is not clear. Because the expected disadvantages from the use of water do not occur, it may be that the usual and expected type of reaction which takes place between isocyanate groups and water does not take place when treating urethane oils by the method disclosed herein. Thus, the exact composition of the product after treatment with water is not known with certainty. However, it has been found that free isocyanate groups have essentially disappeared from the isocyanate-modified oil composition after treatment; in most cases the amount of isocyanate groups remaining is less than can be detected by the use of the analytical techniques described above. Except for the absence of residual free isocyanate groups and the greatly reduced tendency toward gelation imparted by the water treatment, treated urethane oils have the same properties as the corresponding untreater oil compositions and are used in the same manner.

There are set forth below several examples showing the general method and practice of the invention, but these examples, being illustrative only, should not be construed so as to limit the invention to their details. All parts and percentages are by weight unless otherwise specified. In order to demonstrate the invention in its preferred commercial embodiments, the ordinary toluene diisocyanate of commerce, which is a mixture of 80 percent 2,4-isomer and 20 percent 2,6-isomer, was used in the examples given.

EXAMPLE I

A flask equipped with stirrer, condenser and thermometer was charged with 1060 parts of linseed oil, 120 parts of dehydrated castor oil, 160 parts of glycerol and 90 parts of pentaerythritol and heated to 190° C. After 0.4 part of litharge was added, the mixture was heated to 235° C. and held at that temperature for 1½ hours. The reaction mixture was then cooled and 1740 parts xylene and 570 parts of toluene diisocyanate were added. This mixture was heated to 90–95° C. for 6 hours during which time an additional 10 parts of toluene diisocyanate were added. Heating was then stopped and 3 parts water added to the mixture with stirring. The product after filtration had the following properties:

| | |
|---|---|
| Acid value | 0.36 |
| Weight per gallon (lbs.) | 7.89 |
| Hydroxyl number | 28.30 |
| Solids (percent) | 50.10 |
| Viscosity (Gardner-Holdt) | Z–1 |
| Color (Gardner) | 6+ |

Infrared examination of the product could detect no free isocyanate groups. After storage for four months, this urethane oil showed no appreciable change in viscosity.

EXAMPLE II

A mixture of 2300 parts linseed oil, 220 parts glycerol and 300 parts of styrene-allyl alcohol copolymer having an average molecular weight of 1150 and containing an average of 5.2 hydroxyl groups per mole (Shell Polyol X–450) was heated to 235° C. over a period of 2 hours with 0.45 part litharge being added at 186° C. The mixture was then held at 235° C. for 2 hours and then cooled.

A mixture of 1550 parts of the reaction product prepared above, 2050 parts mineral spirits and 400 parts of toluene diisocyanate was heated to 95° C. over a 2½-hour period and held there for 2½ additional hours. There were then added 3 parts water and the reaction mixture was cooled and filtered. The product contained no detectable free isocyanate groups and had the following properties:

| | |
|---|---|
| Weight per gallon | 7.88 |
| Hydroxyl number | 7.00 |
| Solids (percent) | 50.20 |
| Viscosity (Gardner-Holdt) | G+ |
| Color | 6+ |

EXAMPLE III

A reaction vessel was charged with 1120 parts linseed fatty acid, 266 parts of trimethylolethane, 136 parts of pentaerythritol, 158 parts of phthalic anhydride and about 45 parts xylene. The mixture was heated to 200–250° C. for about 6 hours at which time it had an acid value of 1.4; 92 parts of water were removed during the heating. After cooling about 1270 parts of mineral spirits and 360 parts of toluene diisocyanate were added. This mixture was then heated to about 95° C. for 6½ hours and then 150 parts mineral spirits and 2.5 parts water were added and the mixture cooled. After filtration the product had the following properties:

| | |
|---|---|
| Viscosity (Gardner-Holdt) | Z–4 |
| Color (Gardner) | 12+ |
| Acid number | 0.45 |
| Weight per gallon (lbs.) | 7.44 |
| Hydroxyl value | 18.80 |
| Solids (percent) | 48.70 |
| Isocyanate groups | None detected |

A sample of the above treated oil was stored for over four months with essentially no change in its viscosity.

EXAMPLE IV

A mixture of 1256 parts linseed oil, 90 parts glycerol, 146 parts pentaerythritol and 0.5 part stannous fluoride were heated to 235° C. for 2 hours. After cooling to 150° C., 172 parts tetrahydrophthalic anhydride and 45 parts xylene were added. The mixture was then heated to about 215° C. for 4 hours during which time a total of 80 parts of water were removed. The reaction mixture, which then had an acid number of 1.0, was cooled and 1330 parts mineral spirits and 338 parts toluene diisocyanate were added. After heating to 95–100° C. for 2½ hours, the heat was removed and 2 parts distilled water were added. The product obtained after filtration had properties similar to those above with no detectable free isocyanate groups. Its Gardner-Holdt viscosity as produced was Z–4+; after 84 days, its viscosity was Z–4.

EXAMPLE V

A reaction similar to those above was carried out by reacting 1345 parts linseed oil, 80 parts glycerol, 138 parts pentaerythritol, 0.5 part stannous fluoride and 256 parts diphenic acid. The partial alkyd was cooled and diluted with 1420 parts of mineral spirits. Toluene diisocyanate (316 parts) and stannous octoate (0.4 part) were added and the mixture was stirred for several hours at 95° C. When the viscosity remained constant, the reaction mixture had an isocyanate content of about 0.1 percent. After treatment with 2.5 parts water, the product obtained again had desirable properties with no detectable free isocyanate groups.

In these and similar tests, it was clearly established that isocyanate-modified oil compositions essentially free of residual isocyanate groups are produced by treating any urethane oil with water and that the treated urethane oils are clear and homogeneous and are storable for long periods of time without gelation.

According to the provisions of the patent statutes, there are described above the principle and mode of practicing the invention and what are now considered to be its best embodiments. However, it is desired to have it understood that, within the scope of the appended claims, the invention may be practiced otherwise than as specifically described.

What is claimed is:

1. A method of producing ungelled, storage-stable, isocyanate-modified oil compositions essentially free of residual isocyanate groups which comprises reacting an oil selected from the group consisting of drying, semi-drying and non-drying vegetable and marine oils and oil acids thereof with a polyol and an organic isocyanate to produce a urethane oil, and after at least about 95 percent of said organic isocyanate has reacted mixing said urethane oil with water in an amount sufficient to react with essentially all of the free isocyanate groups in said urethane oil.

2. A method of producing ungelled, storage stable, isocyanate-modified oil compositions essentially free of residual isocyanate groups which comprises reacting a drying oil with a polyol and an organic isocyanate to produce a urethane oil, and after at least about 95 percent of said organic isocyanate has reacted mixing said urethane oil with water in an amount sufficient to react with essentially all of the free isocyanate groups in said urethane oil.

3. A method in accordance with claim 1 in which the amount of water is between about 0.01 and about 0.5 percent by weight of said urethane oil.

4. A method in accordance with claim 1 in which said organic isocyanate is toluene diisocyanate.

5. A method of producing ungelled, storage-stable, isocyanate-modified oil compositions essentially free of residual isocyanate groups which comprises reacting an hydroxyl-containing alkyd resin modified with an oil selected from the group consisting of drying, semi-drying and non-drying vegetable and marine oils and oil acids thereof, with an organic isocyanate to produce a urethane oil, and after at least about 95 percent of said organic isocyanate has reacted mixing said urethane oil with water in an amount sufficient to react with essentially all the free isocyanate groups in said urethane oil.

6. A method of producing ungelled, storage stable, isocyanate-modified oil compositions essentially free of residual isocyanate groups which comprises reacting a drying oil-modified hydroxyl-containing alkyd resin with an organic isocyanate to produce a urethane oil, and after at least about 95 percent of said organic isocyanate has reacted mixing said urethane oil with water in an amount sufficient to react with essentially all of the free isocyanate groups in said unrethane oil.

7. A method in accordance with claim 5 in which the amount of water is between about 0.01 and about 0.5 percent by weight of said urethane oil.

8. A method in accordance with claim 5 in which said organic isocyanate is toluene diisocyanate.

9. In a method of producing ungelled, storage-stable, isocyanate-modified oil compositions essentially free of residual isocyanate groups in which an oil selected from the group consisting of drying, semi-drying and non-drying vegetable and marine oils and oil acids thereof is reacted with a polyol and an organic isocyanate to produce a urethane oil, the added step of mixing said urethane oil with water after at least about 95 percent of said organic isocyanate has reacted, said water being added in an amount sufficient to react with essentially all the free isocyanate groups in said urethane oil.

10. In a method of producing ungelled, storage-stable, isocyanate-modified oil compositions essentially free of residual isocyanate groups in which a drying oil is reacted with a polyol and an organic isocyanate to produce a urethane oil, the added step of mixing said urethane oil with water after at least about 95 percent of said organic isocyanate has reacted, said water being added in an amount sufficient to react essentially all of the free isocyanate groups in said urethane oil.

11. In a method of producing ungelled, storage-stable, isocyanate-modified oil compositions essentially free of residual isocyanate groups in which an oil-modified hydroxyl-containing alkyd resin is reacted with an organic isocyanate to produce a urethane oil, the added step of mixing said urethane oil with water after at least about 95 percent of said organic isocyanate has reacted, said water being added in an amount sufficient to react with essentially all of the free isocyanate groups in said urethane oil.

12. An ungelled, storage-stable, isocyanate-modified oil composition essentially free of residual isocyanate groups comprising the reaction product formed by reacting an oil selected from the group consisting of drying, semi-drying and non-drying vegetable and marine oils and oil acids thereof with a polyol and an organic isocyanate to produce a urethane oil, and after at least about 95 percent of said organic isocyanate has reacted mixing said urethane oil with water in an amount sufficient to react with essentially all of the free isocyanate groups in said urethane oil.

13. The composition of claim 12 in which the amount of water used is between about 0.01 and about 0.5 percent by weight of said urethane oil.

14. An ungelled, storage-stable, isocyanate-modified oil composition essentially free of residual isocyanate groups comprising the reaction product formed by reacting an oil-modified hydroxyl-containing alkyd resin with an organic isocyanate to produce the urethane oil and after at least about 95 percent of said organic isocyanate has reacted mixing said urethane oil with water in an amount sufficient to react essentially all of the free isocyanate groups in said urethane oil.

15. The composition of claim 14 in which the amount of water used is between about 0.01 and about 0.5 percent by weight of said urethane oil.

References Cited by the Examiner

UNITED STATES PATENTS

| | | | |
|---|---|---|---|
| 2,929,800 | 3/1960 | Hill | 260—77.5 |
| 2,970,123 | 1/1961 | Rhodes et al. | 260—22 |
| 2,981,712 | 4/1961 | Harper | 260—22 |
| 3,006,884 | 10/1961 | Phillips | 260—18 |
| 3,022,326 | 2/1962 | Schroeder et al. | 260—18 |
| 3,047,520 | 7/1962 | Fiel | 260—18 |

FOREIGN PATENTS 880,845   10/1961   Great Britain.

LEON J. BERCOVITZ, *Primary Examiner.*

R. W. GRIFFIN, C. W. IVY, *Assistant Examiners.*